May 19, 1925.　　　　　　　　　　　　　　　　　　1,538,701
A. O. HURXTHAL ET AL
DRIER
Filed Oct. 15. 1924　　　　3 Sheets-Sheet 1

Inventors—
Alpheus O. Hurxthal,
Henry L. Gabson,
by their Attorneys
Howson & Howson

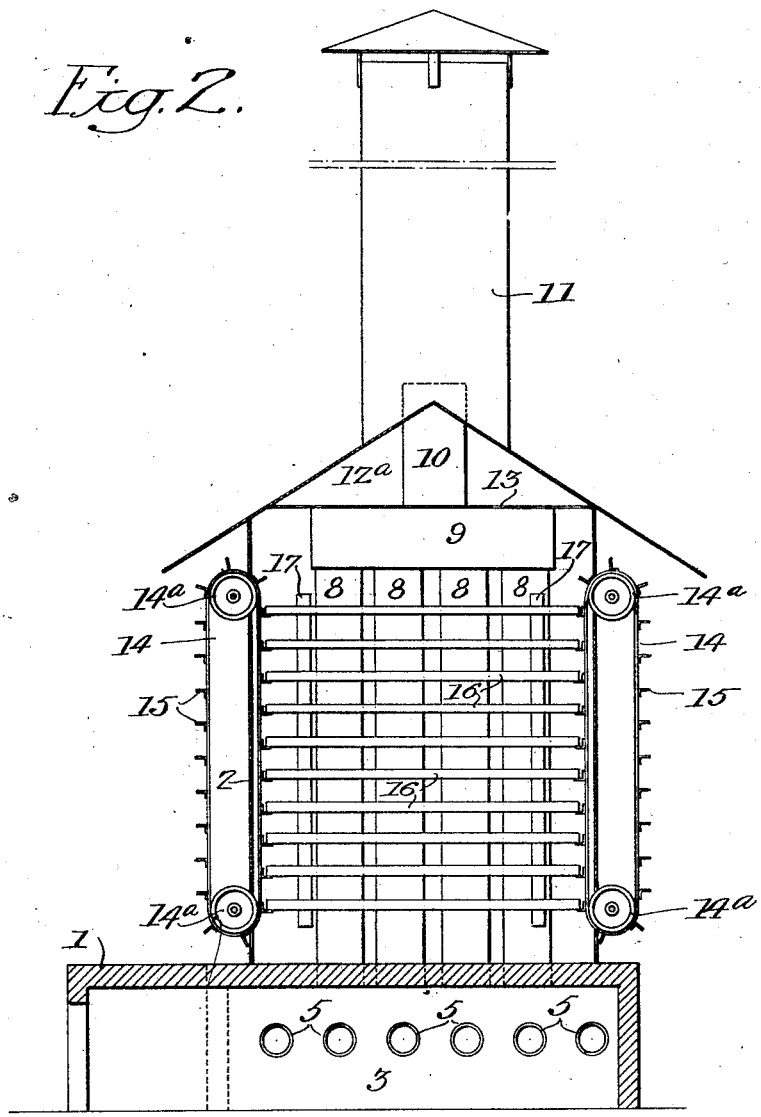

May 19, 1925. 1,538,701
A. O. HURXTHAL ET AL
DRIER
Filed Oct. 15, 1924 3 Sheets-Sheet 3
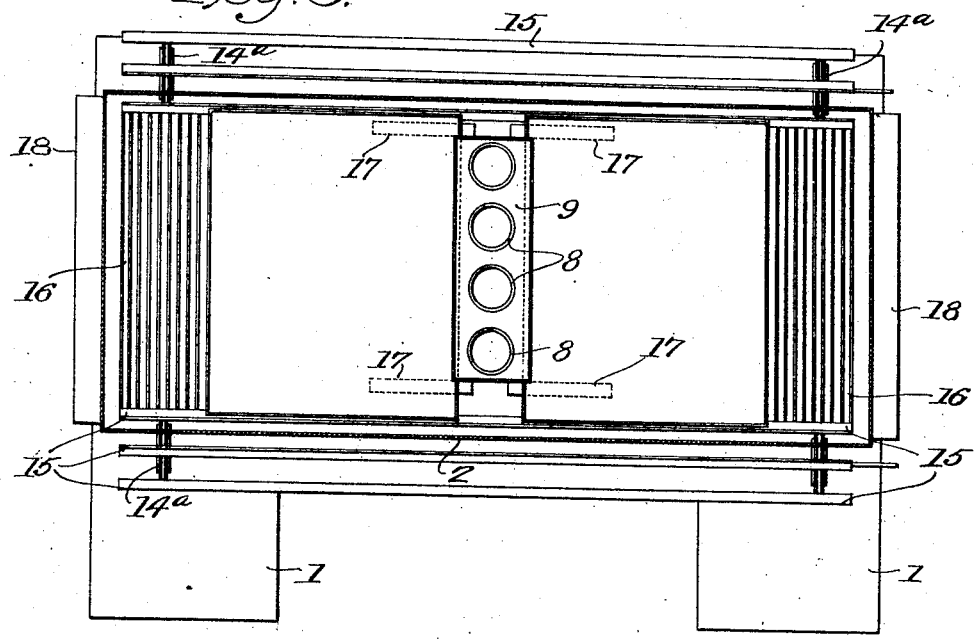
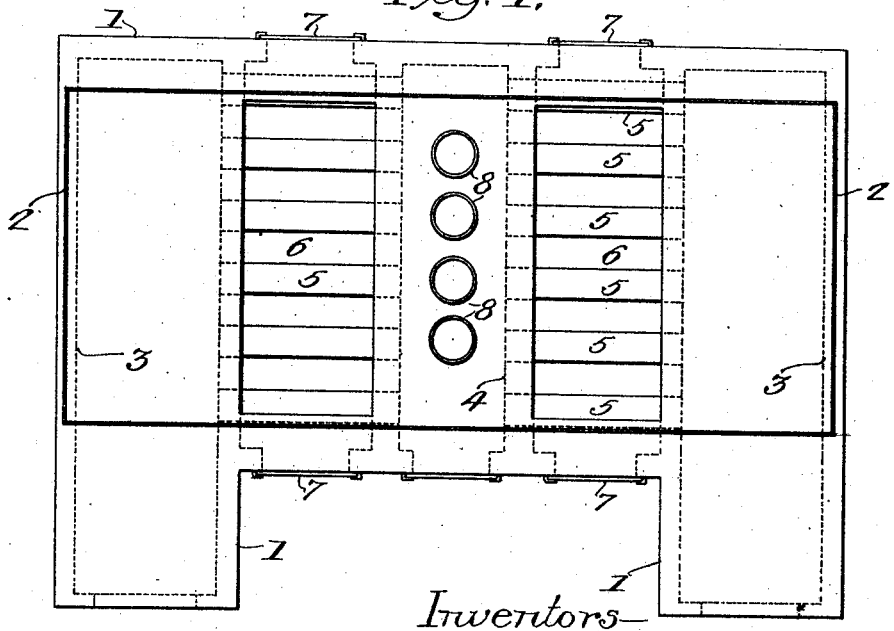
Inventors
Alpheus O. Hurxthal,
Henry L. Galson,
by their Attorneys.

Patented May 19, 1925.

1,538,701

UNITED STATES PATENT OFFICE.

ALPHEUS O. HURXTHAL AND HENRY L. GALSON, OF PHILADELPHIA, PENNSYLVANIA, ASSIGNORS TO PROCTOR & SCHWARTZ, INCORPORATED, OF PHILADELPHIA, PENNSYLVANIA, A CORPORATION OF PENNSYLVANIA.

DRIER.

Application filed October 15, 1924. Serial No. 743,714.

*To all whom it may concern:*

Be it known that we, ALPHEUS O. HURXTHAL and HENRY L. GALSON, who has declared his intention of becoming a citizen of the United States, citizens, respectively, of the United States and Austria, residing in Philadelphia, Pennsylvania, have invented certain Improvements in Driers, of which the following is a specification.

Our invention relates to certain improvements in driers of the tray type, using natural circulation. In this type of drier, the material to be fed is placed on trays and the hot air circulates in the spaces between the trays.

One object of the invention is to improve the circulation of air in the drier by causing air induced draft in the drying chamber. This object is attained by discharging the hot furnace gases into the stack that communicates with the upper end of the drying chamber.

A further object of the invention is to design the trays and the mechanism connected therewith so that the air circulates freely through the drying chamber.

When a tray of dried material is removed from the bottom of the drier, the mechanism is operated so as to move the series of trays downwards, and a tray of material to be dried is inserted in the drier at the upper end thereof. The trays are moved gradually towards the outer wall of the drier as they are fed downwards.

In the accompanying drawings:

Fig. 2 is a sectional view on the line 2—2, Fig. 1;

Fig. 3 is a sectional plan view on the line 3—3, Fig. 1; and

Fig. 4 is a sectional plan view on the line 4—4, Fig. 1.

Figure 1:
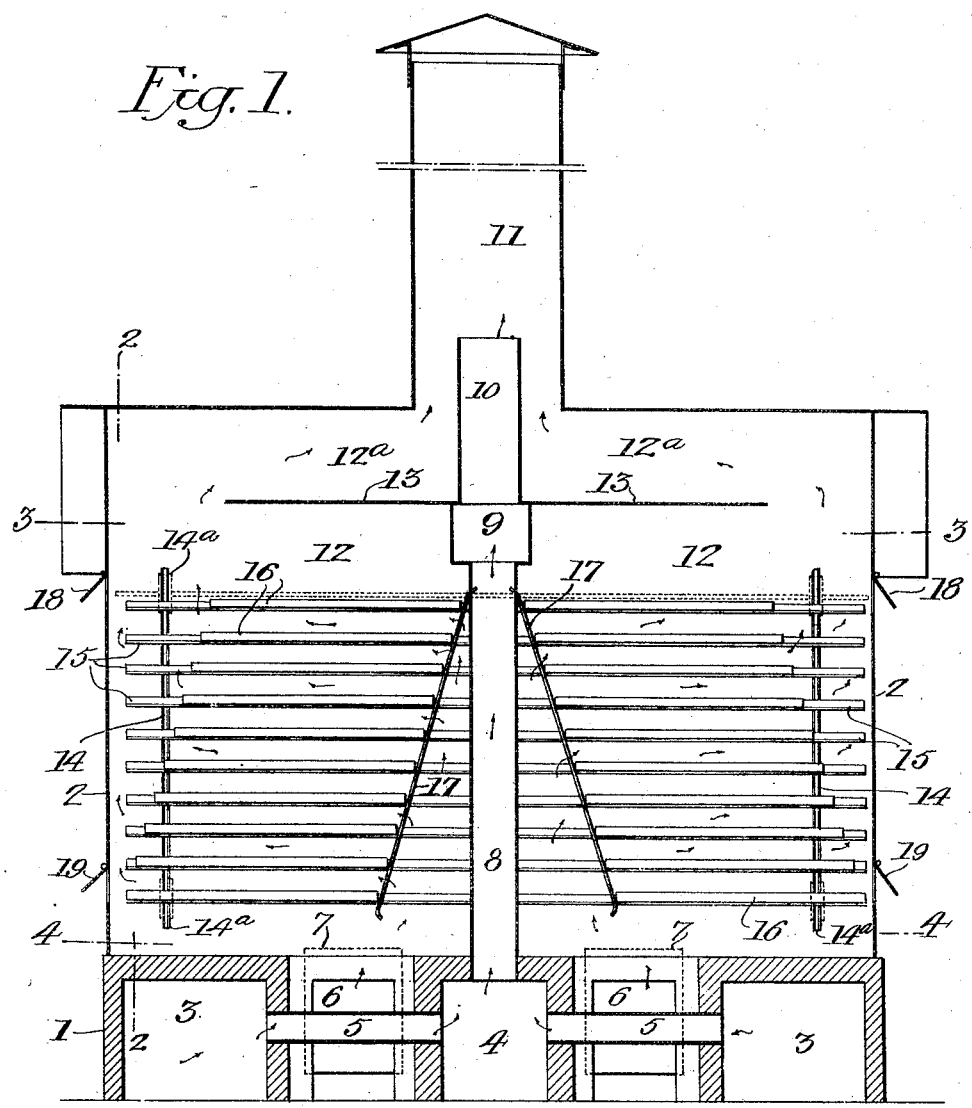
Fig. 1 is a sectional elevation of my improved tray drier.

The drier consists of a base 1 and a body portion 2, in which the material to be dried is located. In the base 1 are two fire boxes 3, 3 and a central flue 4, which has a clean out opening at one end. This central flue is connected to the fire boxes by series of pipes 5, which cross the air chambers 6. At the ends of the air chambers are doors 7, which can be regulated to control the flow of air into the drier.

The central flue communicates with a series of flue pipes 8. These flue pipes open into a transverse manifold 9 that has a central exhaust flue 10, which extends into a stack 11 that communicates with the drying chamber 12. The combustion gases escaping from the flue 10 cause an induced draft in the stack 11 and drying chamber 12. The upper portion 12$^a$ of the drying chamber is provided with a deflecting plate 13, which causes the air to circulate in the direction indicated by the arrow so as to retain as much heat as possible in the drying chamber.

At each side of the body portion 2 are endless carrying belts 14, which have a series of rails 15 that are spaced a given distance apart and upon which the trays 16 are mounted. These belts pass around wheels 14$^a$ at the upper and lower ends of the body portion, as shown in Fig. 2.

On each side of the vertical flues 8 are diagonal guide rails 17, which push the trays towards the ends of the casing of the body portion 2, as the trays are fed downwards. It will be understood that the trays are of a length somewhat less than the depth of each section of the drier to allow for the free escape of heated air as it passes through the spaces between the trays, carrying off the moist air. This construction allows for the free ingress of air from the bottom of the drier to the spaces between the trays, as clearly illustrated in Fig. 1. In this instance, the drier illustrated is a double tray drier. One series of trays is on one side of the series of central flues, and the other series is on the other side. It will be understood that, in some cases, a drier having a single series of trays may be used.

At the upper end of the drier are feed doors 18, which can be opened to allow trays to be inserted in the drier. At the lower end of the drier are hinged doors 19, which can be opened to allow for the removal of the trays having the dried material thereon.

Our improved drier is especially adapted for drying copra. The trays are filled with copra and are placed in the upper portion of the drier after the other trays of dried copra have been removed from the drier. The endless carrier belts are turned by any suitable means to bring the rails in proper position to receive the trays. As the trays are moved downwards, they are pushed forward by the inclined rails 17, and they can be readily removed from the bottom, as hereinbefore described.

The air passes into the drier through the openings 6 and passes first around the pipes 5 and then up and around the series of vertical flues 8, after which it passes through the spaces between the trays and then up and into and through the stack 11. The draft is induced by the escape of the hot combustion gases into the stack, as shown clearly in Fig. 1.

We claim:

1. The combination in a drier, of a base having a fire box and flues; a drying chamber located above the base; a series of vertical flues extending through the drying chamber, said flues communicating with the flues in the base and terminating in an exhaust flue; and a stack communicating with the drying chamber, said exhaust flue extending into the stack.

2. The combination in a drier, of a base; an air heating furnace therein; a drying chamber above the base; means, in said drying chamber, for supporting material to be dried; a series of vertical heating flues extending from the base through the drying chamber; a manifold at the upper end of said vertical flues; an exhaust flue communicating with the upper portion of the drying chamber; and a deflecting plate extending in the drying chamber at each side of the manifold, the exhaust flue terminating within the stack to cause an induced draft in the drying chamber.

3. The combination in a tray drier, of a base; a fire box; flues communicating with the fire box; a series of vertical flues; a casing enclosing a drying chamber; two endless carriers; rails thereon, said carriers being located at each side of the drying chamber; inclined guide rails; and trays mounted on the rails of the endless carriers, said trays being pushed forward as they are lowered.

4. The combination in a tray drier, of a base; two fire boxes in the base; a centrally located flue; pipes leading from the fire boxes to the flue; air chambers on each side of the flue through which the pipes extend; a series of vertical flue pipes communicating with the central flue; a manifold connected with the flue pipes; a pipe leading from the manifold to the stack; a casing enclosing a drying chamber; two endless carriers, one on each side of the drying chamber; rails mounted on the carriers, said rails being spaced apart; trays mounted on the rails; and inclined guide rails on each side of the vertical flues, said rails moving the trays towards the ends of the casing as the trays are lowered.

5. The combination in a tray drier, of a base; a fire box in the base; a central flue; a series of pipes forming communication between the fire box and the flue; air chambers on each side of the central flue through which the pipes extend; a casing enclosing a drying chamber; vertical flues extending from the central flue up through the drying chamber; two endless carriers, one on each side of the drying chamber; rails on the carriers; trays mounted on the rails; inclined guide rails on each side of the central, vertical flue, said trays being shorter than the space between the outer casing and the central flue, said trays being arranged to rest against the inclined rails and to be pushed forward as they are lowered; feed openings in the lower portion of the drier for the trays; a deflecting plate in the upper portion of the drying chamber; and a stack with which the drying chamber and the flues communicate.

ALPHEUS O. HURXTHAL.
HENRY L. GALSON.